Figure 1:
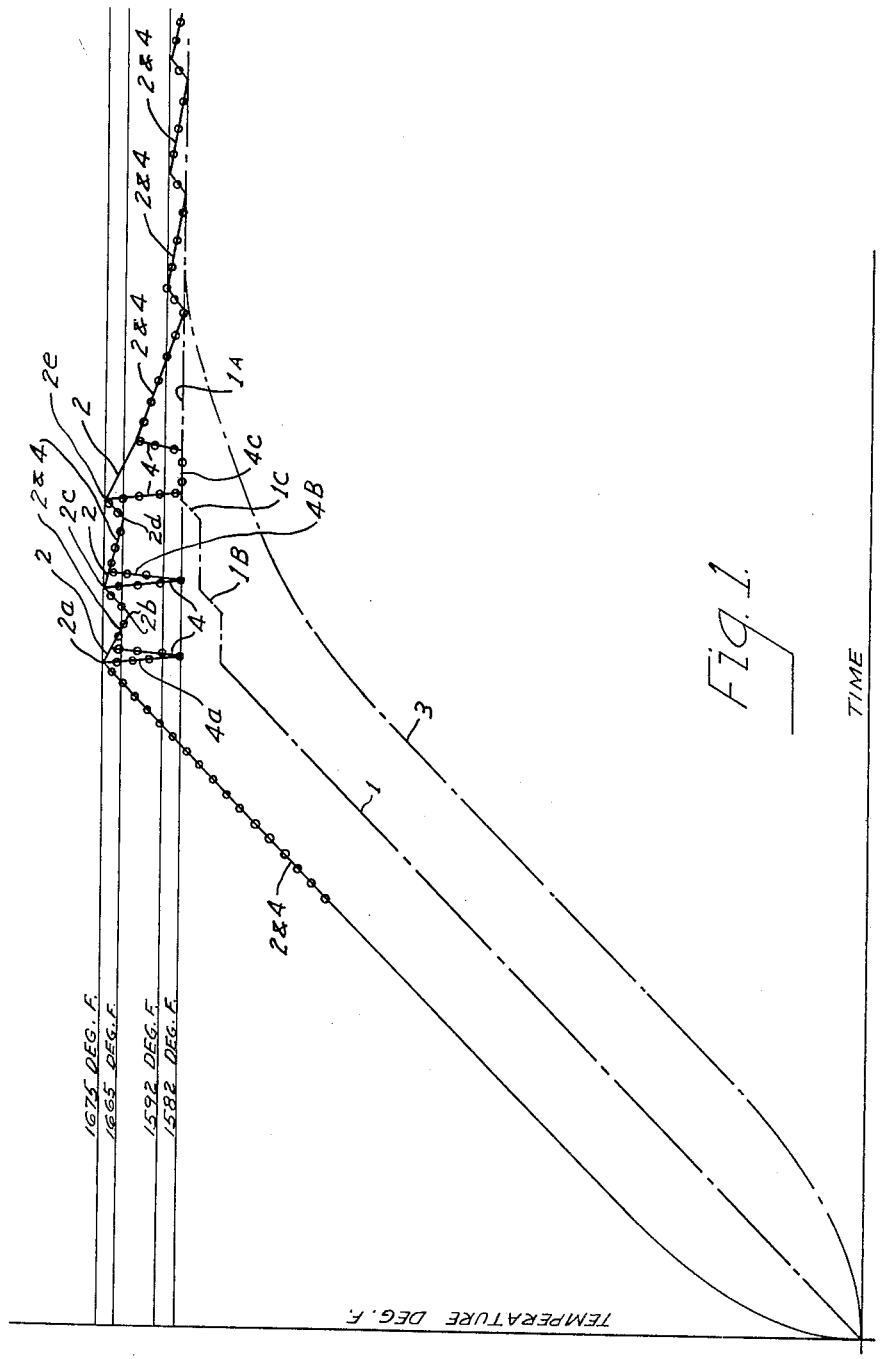

Inventors.
NICHOLAS V. ROSS
VERNON R. PIERON

United States Patent Office 2,988,623
Patented June 13, 1961

2,988,623
METHOD AND APPARATUS FOR INDUCTION HEATING OF BILLETS AND FOR DETERMINING AVERAGE TEMPERATURE THEREOF
Nicholas V. Ross and Vernon R. Pieron, Youngstown, Ohio, assignors to Ajax Magnethermic Corporation, a corporation of Ohio
Filed Mar. 17, 1958, Ser. No. 721,802
8 Claims. (Cl. 219—10.41)

This invention relates to a method and apparatus for the induction heating of billets and the like, and more particularly to a method and apparatus for heating a billet by electrical induction in cycles regulated in response to the average billet temperature determined from the temperature at or near the surface of the billet and the temperature at or near the center of the billet.

In the induction heating of a metal billet, heat is produced very rapidly in the surface stratum or skin of the billet and the heat there produced must flow by conduction to the center of the billet. This flow of heat inherently is much slower than the production of heat in the surface stratum, and consequently, the surface stratum becomes overheated unless provision is made to permit the heat to flow from the surface to the center of the billet at a rate consistent with the production of the heat.

Heretofore, a correlation between the production of heat at the surface of a billet and its rate of flow to the center has been obtained by applying and removing heat in timed cycles predetermined in extent for each specific billet and specific final temperature. A disadvantage of this prior method is that, because of variations in billet size, type of alloy, the desired final temperature, and the like, preliminary tests must be made to determine the number of cycles and the time of each cycle.

The correlation between the production of heat at the surface of a billet and its rate of flow to the center also has been obtained previously, as disclosed in U.S. Patent No. 2,859,323, issued to Bruce E. McArthur et al., on November 4, 1958, by allowing the surface temperature to rise rapidly to a preselected high value only slightly below a maximum permissible temperature and then successively deenergizing and energizing the induction coil in cycles determined by the attainment of the preselected high surface temperature and a somewhat lower minimum surface temperature. When a desired temperature differential or gradient between the temperature at the surface and the temperature at the center of the billet is reached, the cycle is changed to cause power to be turned off when the surface temperature reaches a lower permissible value than the preselected high value and to cause power to be turned on when a somewhat lower minimum surface temperature is reached. This cycling is continued until the temperature differential, between the surface and center, is nearly zero. When this differential temperature method is used, several different limiting temperatures must be preselected for each size and type of billet. Furthermore, it is difficult to determine accurately when the desired mean temperature has been reached.

In accordance with the present invention, the average temperature of the billet and its surface temperature are used to control the cycling of the power input. The disadvantages of the prior methods are eliminated because full control of heating is obtained and preselection of only two temperatures is required. One of these two temperatures is the final average temperature which must be predetermined in any event, and the other is a limiting surface temperature which is not critical since it may be well below the maximum permissible surface temperature. Since it is the average temperature that is to determine when the billet is ready for forging or other hot working, a feedback to the control system of a signal related directly to the average temperature provides a much more accurate control of heating than prior methods not having such a feedback.

The apparatus to be described herein measures the average temperature directly so that the measurement is independent of billet size and heating rates. The average temperature measurement or indication so determined is then used in conjunction with a measurement or indication of surface temperature well under the maximum permissible surface temperature to control the cycling throughout the entire cycling portion of the heating period.

It is well known that a point exists on the cross sectional end surface of a billet where an average temperature can be measured, but the position of this point varies with the heating rate and the billet size and therefore cannot be readily and accurately determined.

Further, in accordance with this invention, an improved means for measuring the average temperature is provided. Three temperature sensing devices, preferably three thermocouple prods, are used. A plus and a minus prod are placed against the end of a billet near the circumferential surface thereof and a minus prod is placed against the same end at or near the axial center of the billet. The two prods near the surface are used to measure the surface temperature and the positive prod near the surface and the minus prod at the center are used to measure the average temperature between the surface and the center.

When a preselected surface temperature measured by the surface prods is reached, a continuous heat supply stage of the heating period is terminated and a cycling stage is started. The cycling is controlled automatically by feedback of a surface temperature indication from the two surface prods as well as an average temperature indication from one of the surface prods and the center prod.

An object of this invention is to provide an improved method and apparatus for heating a billet inductively.

Another object is to provide a method and apparatus for heating a billet inductively to a uniform temperature in a short time and in which the power input is dependent upon the average temperature of the billet during the heating period.

Another object is to provide a method and an apparatus for heating a billet inductively at a rate depending upon the average temperature of the billet as determined by temperature sensitive devices at the surface and at the center of the billet.

Another object is to provide a method and apparatus for heating a billet inductively in which a cycling stage of the heating period is controlled by feedback signals taken alternately from the surface of the billet and from the surface and center.

Figure 2:
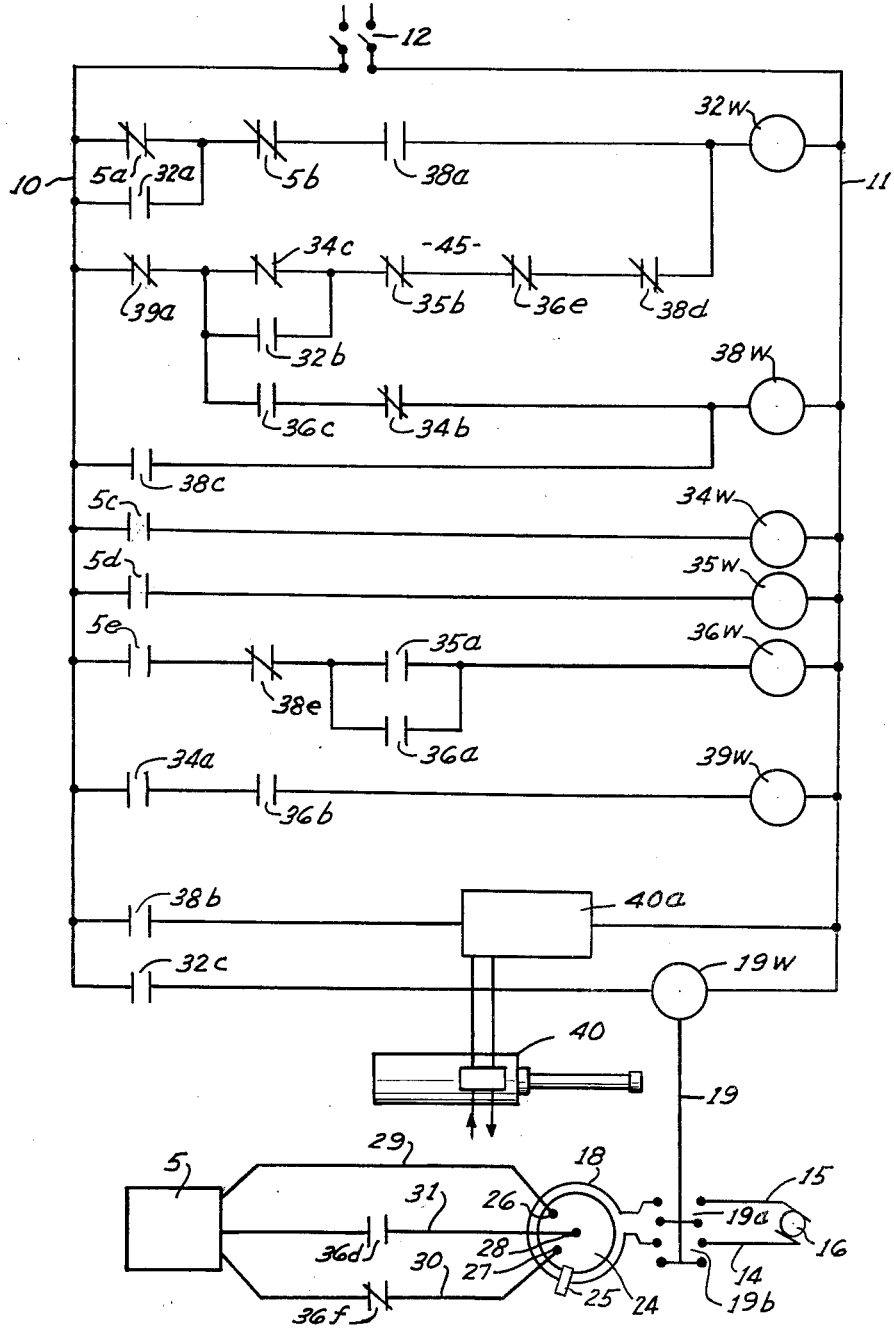

Other objects and advantages will become apparent from the following description wherein reference is made to the drawings, in which:

FIG. 1 is a graph illustrating a heating cycle of a billet in accordance with this invention, and FIG. 2 is a diagrammatic side elevation of an apparatus suitable for performing the method and an elementary wiring diagram of a control system for use in connection therewith and embodying the principles of the invention.

Referring first to the graph of FIG. 1, the ordinate indicates temperature in degrees Fahrenheit and the abscissa indicates time in minutes. For purposes of explanation, it is assumed that an exemplary billet is to reach an average temperature of 1582° F., as indicated by portion 1a of an average temperature curve 1, and that the temperature attained at the surface of the billet is not to exceed 1675° F., as indicated by a point 2a on a surface temperature curve 2. The variation in the temperature at the axial center line of the billet is indicated by a curve 3. The position of a recording stylus (not shown) associated with a recording and contact-making temperature responsive instrument 5 forming part of the control system of FIG. 2, is shown by a curve 4.

The curve 4 coincides with the curve 2 initially, swings toward the curve 1 cyclically between increments of heating, and, near the termination of each increment of the heating period, coincides again with the curve 2 to record surface temperature.

It is apparent from the graph of FIG. 1 that the temperature of the billet surface stratum or skin, indicated by the curve 2, rises rapidly in a substantially linear relation with respect to time during initial heating of the billet and soon reaches the limiting temperature of 1675° F., indicated at the point 2a. During this initial time interval, the instrument 5 is recording the surface temperature and consequently the curve 4 coincides with the curve 2. The temperature at the center of the billet and the average temperature are rising as indicated by the curves 3 and 1, respectively.

When the surface temperature reaches 1675° F., heating is automatically stopped and the instrument 5 starts to read the average temperature, as will be described. Because, in the example selected, the average temperature has not at this time reached the desired value of 1582° F., the instrument 5, after a time delay, again reads the surface temperature. This change from surface to average and back to surface temperature response of the instrument 5 is indicated by a V-shaped portion 4a of the curve 4. Upon return of the instrument 5 to surface temperature indication, it is assumed that the surface temperature has decreased to a point 2b, below a lower control point 1665° F., after a predetermined short time delay. Then power is again turned on and the surface temperature rises from the point 2b toward a point 2c on the curve 2.

When the point 2c is reached, the surface temperature is again at the upper limiting value of 1675° F. Power is again removed automatically, and the instrument 5 is transferred to read average temperature. Assuming again that the average temperature has not yet reached the desired value of 1582° F., the instrument 5 is immediately returned to read surface temperature. This second swing of the stylus of the instrument 5 is indicated by a portion 4b of the curve 4.

In the example, it is now assumed that the surface temperature is above the lower control value of 1665° F. Power is not reapplied therefore until the lower control value of surface temperature is reached at a point 2d on the curve 2. When power is now reapplied, the surface temperature rises from the point 2d toward a point 2e. When the point 2e is reached, the surface temperature is again at 1675° F. and power is removed. During each of the off periods, the average temperature remains substantially constant, and during each of the on periods it rises as is indicated by portions 1b and 1c of the curve 1.

After power is removed at the point 2e, the instrument 5 again reads average temperature. It is now assumed that the average temperature is above a low average control value of 1582° F. and the instrument 5 is caused to continue to read the average temperature as indicated by the coincidence of the curves 1 and 4 in a region 4c on the curve which coincides with the curve 1. The average temperature of the billet is now approximately at the final desired value of about 1582° F., as indicated by the curve portion 1a.

At the expiration of a fixed time period, the instrument 5 is again transferred to read the surface temperature. The billet can now be ejected. If it is not, the instrument 5 continues to read the surface temperature and cycles the heating periods to maintain the surface temperature and the average temperature between 1582° and 1592° F.

Referring now to FIG. 2, a pair of conductors 10 and 11 are arranged to be connected to a source of control circuit power (not shown) upon closure of a switch 12, and a pair of conductors 14 and 15 are arranged to supply alternating current of either high or low frequency from a suitable source 16 to an induction heating coil or coils 18 upon closure of normally open contacts 19a and 19b of an electromagnetic contactor 19 having an operating coil 19w.

In the wiring diagram portion of FIG. 2, numerous relay operating coils, similar to the coil 19w, are referred to by a reference numeral followed by the letter w. These coils are arranged to magnetically operate respective groups of contacts shown at convenient locations in the diagram. Each contact of a group is identified by the reference numeral of its associated operating coil followed by the letter a, b, c, etc. The coil 19w, as well as all of the relay coils, receive their power for energization from the conductors 10 and 11.

A billet 24 is suitably supported within the coil 18. A removable stop 25, which may be similar to the one shown in Patent No. 2,676,234, issued April 20, 1954, to Robert V. Lackner et al., is provided and supports thermocouple prods 26, 27, and 28, which, for purposes of illustration, are the temperature sensing devices used. The prod 27 is a positive prod, and the prods 26 and 28 are minus prods. The prods 26 and 27 are arranged to engage the end of the billet 24 at respective circumferentially spaced locations near the circumferential surface of the billet 24, and the prod 28 is arranged to engage the end of the billet at its axis or center.

The prods 26, 27, and 28 are connected through respective conductors 29, 30, and 31 to the contact-making instrument 5 which may be of conventional type having contacts 5a, 5b, 5c, 5d, and 5e and the recording stylus heretofore referred to. The contacts 5a and 5b are closed at relatively low temperatures and open at preselected higher temperatures. The contacts 5c, 5d, and 5e are open at relatively low temperatures and close at preselected higher temperatures. For clarity, all of the contacts of the instrument 5 are shown at convenient locations in the diagram instead of in physical association with the instrument.

In the example used herein for purposes of explanation, the contacts 5a are closed when the instrument 5 is measuring a temperature below 1582° F. and are open when the instrument 5 is measuring temperatures above 1582° F. The contacts 5b respond similarly at a temperature of 1592° F. The contacts 5c are open at all temperatures below 1665° F. and are closed at all higher temperatures. The contacts 5d and 5e respond like the contacts 5c but at temperatures of 1675° F., 1582° F., respectively.

The contacts 5a and 5b are disposed in one of several energizing circuits for a relay operating coil 32w which operates normally open contacts 32a, 32b, and 32c. The contacts 5c, 5d, and 5e are arranged to control relay operating coils 34w, 35w, and 36w, respectively. The coil 34w operates a normally open contact 34a and normally closed contacts 34b and 34c. The coil 35w operates a normally open contact 35a and a normally closed contact 35b. The coil 36w operates normally open contacts 36a, 36b, and 36c and normally closed contacts 36d, 36e, and 36f. The contacts 36f and 36d are interposed in the conductors 30 and 31, respectively.

An operating coil 38 of a final temperature control relay operates normally open contacts 38a, 38b, and 38c and normally closed contacts 38d and 38e. A timing function is provided by a suitable electromagnetic time delay relay having an operating coil 39w and a normally closed contact 39a which opens instantly upon energization of the coil 39w but which is delayed in closing after deenergization of the coil 39w.

For ejecting the billet 24 from its position within the coil 18, a suitable conventional eject mechanism 40 may be provided and operated in a conventional manner by an eject circuit 40a.

Operation

With the switch 12 open, and assuming the billet 24 to be at room temperature, all of the contacts are in their normal positions as shown in FIG. 2. Since the contacts 36d are open and the contacts 36f are closed, the instrument 5 is measuring the temperature at the surface of the billet 24 from the minus prod 26 and the positive prod 27.

Upon closure of the switch 12, the coil 32w becomes energized through a circuit 45 including the contacts 39a, 34c, 35b, 36e, and 38d connected in series. Consequent closure of the contacts 32c causes energization of the coil 19w, the contacts 19a and 19b close to connect the induction coil 18 to the source 16 and the surface and core temperatures of the billet 24 start to rise as indicated by the curves 2 and 3, respectively, of FIG. 1, the average of these two temperatures following the curve 1. Since the temperature instrument 5 is connected to measure surface temperature, it is drawing the line 4 which follows the curve 2 at this time.

Since, in the example chosen for purposes of explanation, the final average temperature of the billet 24 is to be 1582° F., instrument 5 is so adjusted that the contacts 5a open and the contacts 5e close when the temperature being read by the instrument 5 reaches this value. It should be remembered that the instrument 5 is now measuring surface temperature. Opening of the contacts 5a is of no effect at this time because the contacts 32a, which by-pass the contacts 5a, are closed and the contacts 38a are open, and the closure of the contacts 5e is of no effect because the contacts 35a and 36a are open.

When the surface temperature reaches a value of 1592° F. or ten degrees above the desired final average temperature of 1582° F. in the present example, the contacts 5b open. Nothing happens upon opening of the contacts 5b at this time because the contacts 38a are open.

In the example, the maximum temperature to which the surface is to attain is 1675° F. Ten degrees below this value, or at 1665° F., the contacts 5c close to cause energization of the coil 34w. The contacts 34a thereupon close and the contacts 34b and 34c open, but no circuit is completed or interrupted. When the surface temperature reaches 1675° F., as indicated by the point 2a on the curve 2 of FIG. 1, the contacts 5d close to energize the coil 35w. Consequent opening of the contacts 35b causes deenergization of the coil 32w and consequent closure of the contacts 35a causes energization of the coil 36w. The contacts 32c thereupon open to disconnect the induction coil 18 from the source 16. Since the contacts 34a are closed, closure of the contacts 36b causes energization of the coil 39w and the contacts 39a open instantly.

Opening of the contacts 36f and closure of the contacts 36d disconnects the instrument 5 from the prods 26 and 27 and connects the instrument instead to the prods 26 and 28 so that the average instead of the surface temperature is now being read. Since the billet 24 has been rapidly heated, its core and, consequently, its average temperature, are both quite low, and the contacts 5a through 5e return rapidly to their normal positions because of the transfer of the instrument 5 from surface to average reading. Opening of the contacts 5d deenergizes the coil 35w, opening the contacts 5c and deenergizing the coil 34w, which, in turn, causes opening of the contacts 34a and deenergization of the coil 39w. Opening of the contacts 5e causes deenergization of the coil 36w. The contacts 36d and 36f thereupon transfer the instrument 5 to temperature measurement at the surface.

During the interval that the average temperature was being read by the instrument 5, the line 4 scribed by the stylus turned downwardly to form the first part of the V-shaped portion 4a. With the surface temperature now being read, the curve 4 rises again as indicated.

Since the surface temperature is above 1592° F., the contacts 5a and 5b open and the contacts 5e close as soon the contacts 36d and 36f operate to transfer the instrument 5 for surface measurement. Although the instrument 5 is now reading surface temperature, power is not reapplied to the coil 18 because the contacts 39a are still open. The surface continues to cool until the point 2b on the curve 2 is reached. This is about two seconds after the coil 39w was deenergized. At the end of this two second interval, the contacts 39a reclose. Since the contacts 34c, 35b, 36e, and 38d are all closed, the coil 32w is again energized through the circuit 45 and the contacts 32c close to cause the coil 19w to close the contacts 19a and 19b. Upon closure of the contacts 19a and 19b, power is reapplied to the coil 18.

The surface temperature now rises toward the point 2c and the average temperature rises as indicated at 1b on the curve 1. When a temperature of 1665° F. is reached at the surface, the contact 5c closes to energize the coil 34w, and, when the surface temperature reaches 1675° F., the contacts 5d close to energize the coil 35w. The contacts 35b thereupon open to deenergize the coil 32w resulting in removal of power from the coil 18 because of deenergization of the coil 19w upon opening of the contacts 32c. Closure of the contacts 35a upon energization of the coil 35w causes energization of the coil 36w and consequent operation of the contacts 36d and 36f to cause the instrument 5 to be responsive to the average instead of the surface temperature. Because the contacts 34a and 36b are both closed, the coil 39w of the time delay relay is energized and the contacts 39a are open.

It is assumed that the average temperature has not yet reached 1582° F. so that the contacts 5a and 5b now close and the contacts 5c, 5d, and 5e open. The coils 34w, 35w, and 39w are deenergized. Opening of the contacts 5e deenergizes the coil 36w, and the contacts 36d and 36f accordingly operate to transfer the instrument 5 for surface measurement. This momentary check of average temperature by the instrument 5 is indicated by the portion 4b of the curve 4.

Since the power has been removed from the coil 18, the billet surface continues to cool toward the point 2d on the curve 2. As soon as the instrument 5 starts to read surface temperature again, the contacts 5a and 5b open and the contacts 5e close. It is assumed now that the surface temperature is between 1165° F. and 1675° F. so that the contacts 5c close but the contacts 5d remain open. With the contacts 5d open, the coil 35w is not energized, and the contacts 35a remain open. The coils 35w and 39w remain deenergized.

The surface of the billet continues to cool and after a time delay the contacts 39a reclose. Since the contacts 5c are closed, the coil 34w is energized and the contacts 34c in the circuit 45 are open and prevent energization of the coil 32w upon closure of the contacts 39a. Accordingly, the surface continues to cool toward the point 2d. When the surface temperature reaches 1665° F. at the point 2d, the contacts 5c open and the coil 34w is deenergized resulting in closure of the contacts 34c. This effects energization of the coil 32w and consequent closure of the contacts 32a and 19a. Heating of the billet starts again and the surface temperature rises toward the point 2e.

When the surface temperature reaches 1665° F. the contacts 5c again close to energize the coil 34w but opening of the contacts 34c is of no effect because the contacts 32b are closed. When the surface temperature reaches 1675° F. at the point 2e, the contacts 5d close to energize the coil 35w opening the contacts 35b in the circuit 45 to remove power from the billet 24 by deenergization of the coils 32w and 19w and closing the contacts 35a to effect energization of the coil 36w to cause the contacts 36d and 36f to transfer the instrument 5 to the prods 26 and 28 for reading of average temperature. The contacts 5c and 5d now open to deenergize the coils 34w, 35w, and 39w, the coil 36w remaining energized because the contacts 36a are closed.

It is now assumed that the average temperature of the billet 24 has risen, as indicated at 1c, to a value between 1582° and 1592° F. The contacts 5b close, but the contacts 5a remain open. The contacts 5e also remain closed causing the coil 36w to remain energized so that the instrument 5 continues to read average temperature.

After a time delay, the contacts 39a close. Since the coil 36w is energized, the contacts 36e are open and prevent reapplication of power to the coil 18. The contacts 36c and 34b are closed so that closure of the contacts 39a causes energization of the coil 38w. The contacts 38b thereupon close to render the eject circuit operative and the billet can now be ejected, if desired, since its average temperature is at approximately the desired value of 1582° F.

If the billet is not ejected, opening of the contacts 38e causes deenergization of the coil 36 to transfer the instrument 5 to surface measurement. Because the contacts 38d are open, power is not reapplied until the surface temperature decreases to 1582° F. At this temperature the contacts 5a and 5b are both closed and, since the contacts 38a are now closed, the coil 32w is energized to cause reapplication of power to the induction coil 18. The contacts 5a and 5b continue to operate at 1582 and 1592° F. alternately to supply the surface with enough heat to compensate for radiation losses, thus maintaining the average temperature at the desired value until ejection is desired, regardless of how long the billet is to be maintained at temperature, the contacts 32a serving to maintain the coil 32w energized after opening of the contacts 5a and before opening of the contacts 5b.

In describing the position of the prods, some are said to be near the center or axis. This expression is to be interpreted to mean at the axis or at a location sufficiently near the center or axis so that it has about the same temperature as at the center or axis. This interpretation is required because in some metals, a heat zone forms in which the temperatures at the center and for a considerable distance out from the center are the same, or are sufficiently near the same so that the difference would not have an appreciable effect on the present method and apparatus.

It is apparent from the foregoing that we have provided a novel method and apparatus for determining the average temperature of a billet and for controlling the heating of the billet in relation to the average temperature.

Having thus described our invention, we claim:

1. The method of heating a billet by induction to substantially uniform temperature throughout its cross section, said method comprising, by induction, intermittently creating successive increments of heat in the surface stratum of the billet so as to maintain the surface stratum within a safe temperature range above the desired average temperature of the billet, while allowing surface temperature to decrease between said successive increments, and, at the same time during each interval that the surface temperature is decreasing toward the lower temperature of said range, producing an electrical signal by the temperature near the surface of the billet and which signal represents the temperature near the surface, producing a second electrical signal which represents the average temperature across the end of the billet, and, when said average temperature of the billet reaches the desired average temperature, allowing the surface temperature to decrease to said desired average temperature, and thereafter controlling, by said control signals, the creation of increments of heat applied to the surface stratum so as to maintain the surface stratum at said desired average temperature.

2. The method according to claim 1 characterized in that said second signal results from a thermocouple prod of one polarity being placed near the surface stratum and another complementary thermocouple prod of opposite polarity from said first prod being placed near the center of the billet, concurrently.

3. The method according to claim 1 characterized in that said surface temperature is obtained by applying two complementary thermocouple prods of opposite polarity close together to an end area of the ingot near the surface for obtaining the surface temperature signal, and a third prod of opposite polarity from one of the first mentioned prods and complementary thereto to an end area of the billet near the billet axis for obtaining the average temperature signal.

4. An induction heating apparatus including an induction coil adapted to accommodate a billet to be heated, temperature sensing means operative to sense directly the temperature of the billet near the surface and the average of the temperature at the surface and the temperature at the center when the billet is accommodated in the coil, respectively, a temperature controller means responsive to the temperature sensing means when the average temperature is below a desired value for maintaining the surface temperature of the billet within upper and lower limits above said average by controlling the energization of said coil in response to the sensed surface temperature, said temperature controller means including means responsive to said temperature sensing means when the average temperature reaches said desired average value to cause said controller means to become responsive to said temperature sensing means to maintain the surface temperature at substantially average value, by controlling the energization of said coil in response to the sensed average temperature.

5. In an induction heating apparatus according to claim 4 characterized in that said temperature sensing means includes a thermocouple having a pair of widely spaced prods of opposite polarity and arranged to engage a billet, one prod near the surface and the other near the axis, for obtaining the average temperature.

6. In an apparatus for controlling the average temperature of a billet, a thermocouple having prods of opposite polarity and arranged in widely spaced relation to, and physically disconnected from each other, with one prod of one polarity positioned for contact with the end of a billet near thet billet axis and another prod of opposite polarity positioned for concurrent contact with the billet near the circumferential surface of the billet, and control means electrically connected to both prods and responsive to the common electrical signals produced in the prods, when the prods are placed in contact with widely spaced areas of a billet, by the temperatures to which they are subjected, respectively, for controlling the heat applied to the billet.

7. In the method of controlling the heating of a billet, the step of applying one prod of a thermocouple to the billet substantially at the billet axis and another prod of the thermocouple, separated and disconnected from, and of opposite polarity from, the first prod to the billet near the circumferential surface of the billet, thereby producing an electric potential representing a composite of the different temperatures at the center and near the surface, and controlling the operation of a heating coil in response to said potential.

8. In a control apparatus for controlling the heating of a billet and including a controller operable in response to electrical potentials, a pair of thermocouple prods of opposite polarity arranged to be concurrently in contact with the billet closely adjacent each other near its circumferential surface, and another prod opposite in polarity from one of said prods of the pair and arranged to be in contact with the billet near the billet axis concurrently with said contact of the pair of prods, and a circuit connecting thet prods to the controller so that it can be responsive to the pair of prods and also to said one of the prods and the one of the pair of opposite polarity therefrom.

References Cited in the file of this patent

UNITED STATES PATENTS

| | | |
|---|---|---|
| 2,400,472 | Strickland | May 14, 1946 |
| 2,631,220 | Barsy | Mar. 10, 1953 |
| 2,676,232 | Dreyfus | Apr. 20, 1954 |
| 2,676,234 | Lackner et al. | Apr. 20, 1954 |
| 2,750,486 | Howell | June 12, 1956 |
| 2,787,692 | Braeuninger et al. | Apr. 2, 1957 |
| 2,828,398 | Lombard | Mar. 25, 1958 |
| 2,852,650 | De Coriolis et al. | Sept 16, 1958 |
| 2,858,405 | Kimbrough et al. | Oct. 28, 1958 |
| 2,859,323 | McArthur et al. | Nov. 4, 1958 |

UNITED STATES PATENT OFFICE
CERTIFICATE OF CORRECTION

Patent No. 2,988,623                          June 13, 1961

Nicholas V. Ross et al.

It is hereby certified that error appears in the above numbered patent requiring correction and that the said Letters Patent should read as corrected below.

Column 6, line 52, for "1165° F." read -- 1665° F. --; column 8, line 49, for "thet" read -- the --; column 9, line 2, for "thet" read -- the --.

Signed and sealed this 7th day of November 1961.

(SEAL)
Attest:

ERNEST W. SWIDER
Attesting Officer

DAVID L. LADD
Commissioner of Patents

USCOMM-DC